United States Patent
Washino et al.

(10) Patent No.: US 12,552,912 B2
(45) Date of Patent: Feb. 17, 2026

(54) BLACK ELASTOMER MOLDED ARTICLE

(71) Applicant: Kitagawa Industries Co., Ltd., Inazawa (JP)

(72) Inventors: Shinya Washino, Kasugai (JP); Ken Huruta, Kasugai (JP); Jo Tamura, Kasugai (JP)

(73) Assignee: Kitagawa Industries Co., Ltd., Aichi (JP)

( * ) Notice: Subject to any disclaimer, the term of this patent is extended or adjusted under 35 U.S.C. 154(b) by 733 days.

(21) Appl. No.: 17/799,241

(22) PCT Filed: Feb. 8, 2021

(86) PCT No.: PCT/JP2021/004637
§ 371 (c)(1),
(2) Date: Aug. 11, 2022

(87) PCT Pub. No.: WO2021/171990
PCT Pub. Date: Sep. 2, 2021

(65) Prior Publication Data
US 2023/0083934 A1    Mar. 16, 2023

(30) Foreign Application Priority Data
Feb. 28, 2020    (JP) .................. 2020-033190

(51) Int. Cl.
| | | |
|---|---|---|
| C08K 3/04 | (2006.01) | |
| C08K 3/22 | (2006.01) | |
| C08K 5/09 | (2006.01) | |
| C08K 9/04 | (2006.01) | |
| G02B 1/11 | (2015.01) | |

(52) U.S. Cl.
CPC ............. *C08K 3/041* (2017.05); *C08K 3/22* (2013.01); *C08K 5/09* (2013.01); *C08K 9/04* (2013.01); *C08K 2003/2224* (2013.01); *G02B 1/11* (2013.01)

(58) Field of Classification Search
CPC combination set(s) only.
See application file for complete search history.

(56) References Cited

FOREIGN PATENT DOCUMENTS

| | | |
|---|---|---|
| CN | 1850504 A | 10/2006 |
| CN | 105938295 A | 9/2016 |
| CN | 106794678 A | 5/2017 |
| JP | 2012-026863 A | 2/2012 |
| JP | 2012-052826 A | 3/2012 |

OTHER PUBLICATIONS

Machine translaiton of Nakai et al (JP 2012026863) (Year: 2012).*
Machine translaiton of CN 105938295 (Year: 2016).*
Machine translaiton of CN 1850504 (Year: 2006).*

* cited by examiner

Primary Examiner — Robert T Butcher
(74) Attorney, Agent, or Firm — Thorpe North & Western

(57) ABSTRACT

A black elastomer molded article according to the present technology is provided with an affixing surface to which an adherend having light transmission property is affixed in a removable manner, wherein the black elastomer molded article includes a thermoplastic elastomer, a black substance, and a softening agent and has an FP hardness of 85 or less, a reflectance (Ym value) of the affixing surface being 5.0% or less, a surface roughness (Ra) of the affixing surface being 1.0 μm or less, and an adhesive force (with respect to SUS) of the affixing surface being from 1.0 N/mm to 8.0 N/mm.

5 Claims, 3 Drawing Sheets

BLACK ELASTOMER MOLDED ARTICLE

RELATED APPLICATIONS

The present application is the National Stage of International Patent Application No. PCT/JP2021/004637 filed on Feb. 8, 2021, which claims the benefit of priority from Japanese Patent Application No. 2020-033190 filed on Feb. 28, 2020, the entire contents of which are incorporated herein by reference.

TECHNICAL FIELD

The present technology relates to a black elastomer molded article.

BACKGROUND ART

In the production process of an optical member such as an anti-reflective film, optical properties such as reflectance are measured for the purpose of quality control and the like. For example, there are cases in which an operator wants to measure the optical properties (such as reflectance) of only the surface arranged on the front side of a pair of front and back surfaces as an optical property of the optical member. In such a case, there has been a practice of affixing a black member to the other surface in order to suppress the optical effects (such as reflection) on the other surface that is arranged on the back side (Japan Unexamined Patent Publication Nos. 2012-26863A and 2012-52826 A).

The black member is composed of, for example, black urethane gel, and has adhesive force (see Japan Unexamined Patent Publication No. 2012-52826 A). By utilizing the adhesive force, such a black member is affixed to the optical member in a removable manner. Note that in a case in which an air layer such as an air bubble is formed between the black member and the optical member during the affixing of the black member, the impact on optical effects, such as reflection, on the surface of the optical member with the black member affixed is increased due to the air layer. As such, when affixing the black member, it is necessary to be careful that an air bubble is not formed between the black member and the optical member as much as possible.

Note that, in the related art, the measurement of optical properties of this type is mainly performed on a long and film-shaped optical member that is ultimately rolled into a roll shape. Therefore, a typical black member is processed into a roll shape or a sheet shape.

A typical black member was used in large-scale production devices for optical members, and was required to be continuously used on large optical members. As such, it was necessary for a typical black member to be provided with a certain degree of hardness (strength) so as to withstand continuous use. For example, Japan Unexamined Patent Publication No. 2012-52826 A discloses a black member having an Asker C hardness from 50 to 70.

When such a typical black member is used to measure the precise optical properties of an optical member, an air layer such as an air bubble tends to form between the optical member and the black member.

In addition, when a typical black member is used on, for example, an optical member having a curved surface (such as an optical lens), the adhesion (conformability) to the curved surface is poor, and an air layer tends to form between the optical member having a curved surface and the black member.

SUMMARY

The present technology provides a black elastomer molded article having a low hardness and in which the formation of an air layer between the black elastomer molded article and an adherend is suppressed.

<1> A black elastomer molded article provided with an affixing surface to which an adherend having light transmission property is affixed in a removable manner, wherein the black elastomer molded article includes a thermoplastic elastomer, a black substance, and a softening agent and has an FP hardness of 85 or less, a reflectance (Ym value) of the affixing surface being 5.0% or less, a surface roughness (Ra) of the affixing surface being 1.0 μm or less, and an adhesive force (with respect to SUS (System Usability Scale)) of the affixing surface being from 1.0 N/mm to 8.0 N/mm.

<2> The black elastomer molded article according to <1>, wherein a difference (d1−d2) between a refractive index d1 of the adherend and a refractive index d2 of the softening agent is 0.115 or less.

<3> The black elastomer molded article according to <1> or <2>, wherein a difference (d2−d3) between a refractive index d2 of the softening agent and a refractive index d3 of the thermoplastic elastomer is 0.115 or less.

<4> The black elastomer molded article according to any one of <1> to <3>, wherein the black elastomer molded article includes a filler in addition to the black substance.

<5> The black elastomer molded article according to any one of <1> to <4>, wherein the thermoplastic elastomer is composed of a styrene-based thermoplastic elastomer.

<6> The black elastomer molded article according to any one of <1> to <5>, wherein the softening agent is composed of a process oil.

According to the technology of the present application, it is possible to provide a black elastomer molded article having a low hardness and in which the formation of an air layer between the black elastomer molded article and an adherend is suppressed.

Other characteristics and advantages of the present technology will become apparent from the following description with reference to the accompanying drawings. Note that, in the accompanying drawings, the same reference numerals are assigned to the same or similar configurations.

BRIEF DESCRIPTION OF DRAWINGS

The accompanying drawings are included in the specification, constitute a part thereof, and illustrate embodiments of the present technology, and together with the description, the drawings are used to explain the principles of the present technology.

DETAILED DESCRIPTION

Hereinafter, embodiments will be described in detail with reference to the accompanying drawings. It should be noted that the following embodiments do not limit the technology according to the claims, and not all combinations of features described in the embodiments are essential to the technology. Two or more of the plurality of features described in the embodiments may be combined in any manner. In addition, the same or similar configurations will be given the same reference numbers, and repeated explanations will be omitted.

First Embodiment (Black Elastomer Molded Article 10)

Figure 1:
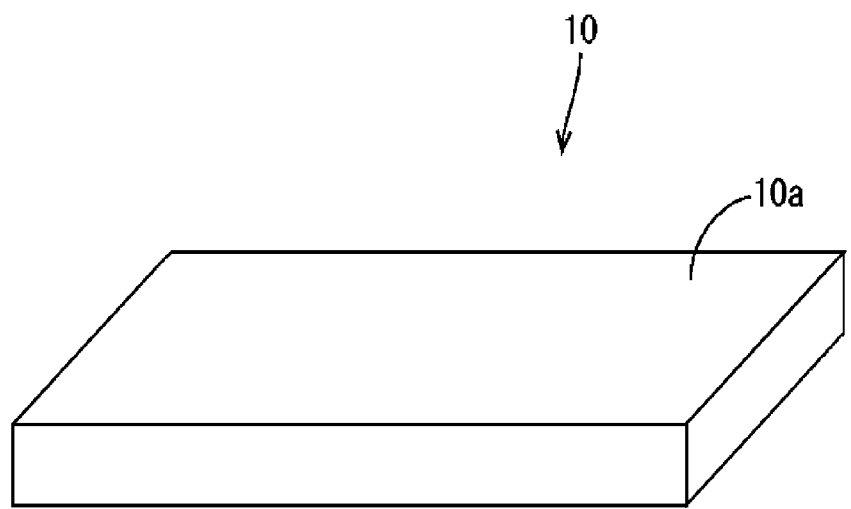
FIG. 1 is a perspective view of a black elastomer molded article according to the first embodiment.
Figure 2:
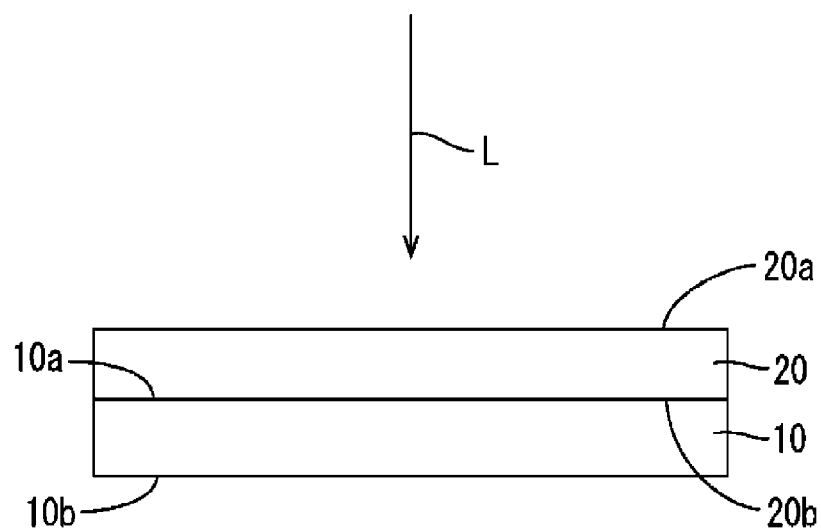
FIG. 2 is a side view illustrating a state in which a back surface of an optical member is affixed to an affixing surface of a black elastomer molded article.

FIG. 1 is a perspective view of a black elastomer molded article 10 according to the first embodiment. The black elastomer molded article 10 is a jig that is used by affixing to an adherend having light transmission property (for example, an optical member such as an optical lens or an optical film) when evaluating the optical properties (such as reflectance) of the adherend. FIG. 2 is a side view illustrating a state in which a back surface 20b of an optical member 20 is affixed to an affixing surface 10a of the black elastomer molded article 10.

As illustrated in FIGS. 1 and 2, the black elastomer molded article 10 is in a sheet shape having a predetermined thickness, with the surface facing the front side (the upper side in FIG. 1 and FIG. 2) being the affixing surface 10a. For example, as illustrated in FIG. 2, when measuring the reflectance of one surface 20a arranged on the front side (the upper side in FIG. 2) of the sheet-shaped optical member (an example of an adherend) 20, the black elastomer molded article 10 is affixed to the optical member 20 in a manner that the other surface 20b of the optical member 20 arranged on the back side (the lower side in FIG. 2) is covered with the affixing surface 10a. Further, a light L from a light source is emitted towards the surface 20a on the front side of the optical member 20. Because the black elastomer molded article 10 is affixed to the surface 20b on the back side of the optical member 20, the light travels to the outside of the optical member 20 via the surface 20b is, for example, absorbed by the black elastomer molded article 10. In this way, when measuring the reflectance (reflected light) of one surface 20a, the impact on optical effects such as reflection on the other surface 20b is suppressed by the black elastomer molded article 10.

Note that, a protective film (not illustrated) composed of a plastic film or the like may be affixed to the other surface 10b, which is on the opposite side of the affixing surface 10a, as necessary.

The black elastomer molded article 10 mainly includes a thermoplastic elastomer, a black substance, and a softening agent. Note that, as described later, each of the various properties of the black elastomer molded article 10, including "FP hardness", "reflectance of the affixing surface 10a (Ym value)", "surface roughness (Ra) of the affixing surface 10a", and "adhesive force (with respect to SUS) of the affixing surface 10a", is set to be a predetermined value. The type and blending amount of each of the components of the black elastomer molded article 10, such as the thermoplastic elastomer, the black substance, and the softening agent, are set so that each of the properties reaches a predetermined value.

Thermoplastic Elastomer

The thermoplastic elastomer is the main component of the black elastomer molded article 10, and is preferably included in the black elastomer molded article 10 in a proportion of 15 mass % or greater. Examples of the thermoplastic elastomer include a styrene-based thermoplastic elastomer, a polyolefin-based thermoplastic elastomer, a polyurethane-based thermoplastic elastomer, a polyester-based thermoplastic elastomer, a polyamide-based thermoplastic elastomer, a polybutadiene-based thermoplastic elastomer, a polyisoprene-based thermoplastic elastomer, and a fluororubber-based thermoplastic elastomer. These thermoplastic elastomers may be used alone or in a combination of two or more as long as the present technology is not impaired.

The thermoplastic elastomer is preferably a styrene-based thermoplastic elastomer from the viewpoint of having moderate hardness, elasticity, and the like.

Examples of the styrene-based thermoplastic elastomer include a styrene-isoprene-styrene block copolymer (SIS), a styrene-butadiene-styrene block copolymer (SBS), a styrene-ethylene-propylene block copolymer (SEP), a styrene-ethylene-butylene-styrene block copolymer (SEBS), a styrene-ethylene-propylene-styrene block copolymer (SEPS), and a styrene-ethylene-ethylene-propylene-styrene block copolymer (SEEPS). These styrene-based thermoplastic elastomers may be used alone or in a combination of two or more as long as the present technology is not impaired. The styrene-based thermoplastic elastomer is preferably a styrene-ethylene-ethylene-propylene-styrene block copolymer (SEEPS).

Examples of a commercially available styrene-based thermoplastic elastomer (for example, SEEPS) include "Septon 4055" (trade name, available from Kuraray Co., Ltd.), "Septon 4077" (trade name, available from Kuraray Co., Ltd.), and "Septon 4099" (trade name, available from Kuraray Co., Ltd.).

Black Substance

The black substance is a substance for coloring the black elastomer molded article to black, and a known black pigment, black dye, or the like can be used as long as the present technology is not impaired. Examples of the black substance include carbon black (CB), a carbon nanotube (CNT), graphite, aniline black, cyanine black, titanium black, and black iron oxide. These black substances may be used alone or in combination of two or more of them. Note that, the black substance is preferably a carbon material such as carbon black (CB) or a carbon nanotube (CNT) because it is easy to give the desired black color with a small amount of such a carbon material, and the light reflectance of such a carbon material is low. A carbon nanotube is particularly preferable due to its low light reflectivity.

The content ratio of the black substance in the black elastomer molded article 10, although not limited as long as the present technology is not impaired, is preferably 0.5 mass % or greater, more preferably 1.0 mass % or greater, for example. Note that, the upper limit of the content ratio of the black substance in the black elastomer molded article 10 is preferably 6 mass % or less, more preferably 5 mass % or less, due to reasons such as ensuring the predetermined FP hardness.

Softening Agent

The softening agent is used for the purpose of adjusting the hardness of the black elastomer molded article 10. The softening agent is liquid (oil-like) at room temperature (20° C.), and examples thereof include: a process oil, such as a paraffin process oil, a naphthene process oil, and an aromatic process oil; a poly-®-olefin (PAO); a liquid polybutene; and a liquid polyisobutylene. These softening agents may be used alone or in combination of two or more of them. The softening agent is preferably a process oil, particularly preferably a paraffin process oil, from the viewpoint of excellent compatibility with the thermoplastic elastomer.

Other Components

The black elastomer molded article 10 may include a filler for the purpose of adjusting hardness and the like. In the present specification, the filler does not include the black substance described above. Examples of the filler include a particulate material that has been surface-treated with a higher fatty acid (surface-treated particulate material). In the present specification, the term "surface treatment" refers to a treatment in which a substance that serves as the core of a particle is coated with a higher fatty acid.

Examples of the higher fatty acid include stearic acid, oleic acid, palmitic acid, linoleic acid, lauric acid, caprylic acid, behenic acid, and montanic acid. Among these, oleic acid is preferable. The substance that serves as the core of a particle is not limited as long as the present technology is not impaired, and, for example, magnesium hydroxide can be used. Examples of the surface-treated particulate material include a surface-treated magnesium hydroxide in which a particulate magnesium hydroxide is coated with oleic acid.

The average particle size of the filler, although not limited as long as the present technology is not impaired, is preferably from 0.1 µm to 5 µm, for example.

In addition to the filler, the black elastomer molded article 10 may include another component, such as an ultraviolet light absorber, a preservative, a solvent, a flame retardant, a synthetic resin, a cross-linking agent, or a cross-linking aid, as necessary.

FP Hardness

The black elastomer molded article 10 is set to have an Asker FP hardness of 85 or less. When the Asker FP hardness is such a value, it is easy for the black elastomer molded article 10 to adhere to the surface of an adherend without any gaps and conform to the surface of the adherend. Moreover, even when an air layer such as an air bubble is formed between the adherend and the affixing surface 10a, it is easy for the operator to press the black elastomer molded article 10 with a fingertip or the like to remove such an air layer from between the adherend and the affixing surface 10a. Note that, the upper limit of the Asker FP hardness of the black elastomer molded article 10 is preferably 84 or less, more preferably 83 or less. In addition, the lower limit of the Asker FP hardness of the black elastomer molded article 10, although not limited as long as the present technology is not impaired, is set to be 80 or greater, for example. A method for measuring the Asker FP hardness of the black elastomer molded article 10 will be described later.

The FP hardness can be adjusted by, for example, appropriately setting the blending amount of the softening agent, the blending amount of the filler, or the type of the thermoplastic elastomer.

Reflectance (Ym Value) of Affixing Surface

The black elastomer molded article 10 is set to have a reflectance (Ym value) of the affixing surface 10a of 5.0% or less. In the present specification, the reflectance (Ym value) of the affixing surface 10a is an indicator showing the "blackness" of the black elastomer molded article 10. When the reflectance (Ym value) of the affixing surface 10a is 5.0% or less, it can be said that the affixing surface 10a has sufficient "blackness" and has excellent light absorption. Note that, the reflectance (Ym value) of the affixing surface 10a is preferably 4.7% or less, more preferably 4.6% or less, and even more preferably 4.5% or less. A method for measuring the reflectance (Ym value) of the affixing surface 10a will be described later.

The reflectance (Ym value) of the affixing surface can be adjusted by, for example, appropriately setting the type of the black substance or the blending amount of the black substance.

Surface Roughness (Ra) of Affixing Surface

The black elastomer molded article 10 is set to have a surface roughness (Ra) of the affixing surface 10a of 1.0 µm or less. The upper limit of the surface roughness (Ra) of the affixing surface 10a is preferably 0.8 µm or less, more preferably 0.5 µm or less. Note that, the lower limit of the surface roughness (Ra) of the affixing surface 10a, although not limited as long as the present technology is not impaired, is preferably 0.2 µm or greater, more preferably 0.3 µm or greater, for example. When the surface roughness (Ra) of the affixing surface 10a is such a value, the formation of an air layer such as an air bubble between the affixing surface 10a and the adherend is suppressed while the reflectance of the affixing surface 10a is being suppressed. A method for measuring the surface roughness (Ra) of the affixing surface 10a will be described later.

The surface roughness (Ra) of the affixing surface can be adjusted by, for example, appropriately setting the surface roughness of the mold to be used, or the size or blending amount of the filler, during molding of the black elastomer molded article 10. A specific method for measuring the surface roughness (Ra) will be described later.

Adhesive Force (With Respect to SUS) of Affixing Surface

The black elastomer molded article 10 is set to have an adhesive force (with respect to SUS) of the affixing surface 10a from 1.0 N/mm to 8.0 N/mm. When the adhesive force (with respect to SUS) of the affixing surface 10a is such a value, the affixing surface 10a of the black elastomer molded article 10 can adhere to the adherend in a removable manner. Note that the adhesive force (with respect to SUS) of the affixing surface 10a is preferably from 1.5 N/mm to 5.0 N/mm. A method for measuring the adhesive force (with respect to SUS) of the affixing surface 10a will be described later. In addition, in the present specification, "SUS" refers to a stainless steel material specified in JIS (Japanese Industrial Standards).

The adhesive force (with respect to SUS) of the affixing surface can be adjusted by, for example, appropriately setting the type of the thermoplastic elastomer, the blending amount of the filler, or the blending amount of the softening agent.

Relationship between Refractive Index d1 of Adherend and Refractive Index d2 of Softening Agent The black elastomer molded article 10 is preferably set to have a difference (d1−d2) between the refractive index d1 of the adherend and the refractive index d2 of the softening agent of 0.115 or less. Examples of a material constituting the adherend include a material having light transmitting property, such as glass, or a synthetic resin such as polycarbonate, polyester, or polyolefin. When the affixing surface 10a of the black elastomer molded article 10 is affixed to the adherend, a thin film composed of the softening agent (softening agent film) is adsorbed on the surface of the adherend. As such, when the difference (d1−d2) between the refractive index d1 of the adherend and the refractive index d2 of the softening agent (softening agent film) is set to 0.115 or less, the difference between the refractive indexes of the two is small, making it possible to suppress light reflection at the interface between the adherend and the softening agent.

Relationship between Refractive Index d2 of softening Agent and Refractive Index d3 of Thermoplastic Elastomer Furthermore, the black elastomer molded article 10 is preferably set to have a difference (d2−d3) between the refractive index d2 of the softening agent and the refractive index d3 of the thermoplastic elastomer of 0.115 or less (preferably 0.050 or less). As described above, when the affixing surface 10a of the black elastomer molded article 10 is affixed to the adherend, a thin film composed of the softening agent (softening agent film) is formed on the surface of the adherend. As such, by setting the difference between the refractive index d2 of such a softening agent film and the refractive index d3 of the thermoplastic elastomer, which is the main component of the black elastomer molded article 10, to be a small difference, it is possible to suppress light reflection at the interface.

Method for Producing Black Elastomer Molded Article 10

The method for producing the black elastomer molded article 10 is not limited, and the black elastomer molded article 10 can be produced by, for example, kneading a mixed composition containing the thermoplastic elastomer, the black substance, the softening agent, and the like using a known kneading device while heating, and molding (for example, hot press molding) the obtained kneaded product (mixed composition) using a molding apparatus equipped with a predetermined mold.

Adherend

The adherend to be affixed to the black elastomer molded article 10 is composed of a material having light transmitting property (for example, a material having light transmitting property such as glass, or a synthetic resin such as polycarbonate, polyester, or polyolefin). As illustrated in FIG. 2, an adherend 20 affixed to the black elastomer molded article 10 of the present embodiment has a sheet shape; however, in another embodiment, the adherend 20 may have a shape other than a sheet shape.

Application, Etc.

The black elastomer molded article 10 of the present embodiment has sufficient blackness for absorbing light (visible light or the like). Furthermore, the black elastomer molded article 10 has a predetermined hardness (FP hardness), a predetermined adhesive force, and a predetermined surface roughness (Ra). Such black elastomer molded article 10 can be used when measuring the optical properties (reflectance, transmittance) of the optical member (adherend) 20 or used for visual inspection of the optical member (adherend) 20, or the like.

As described above, the affixing surface 10a of the black elastomer molded article 10 is attached to the surface 10b of the optical member (adherend) 20, the surface 10b being on the opposite side of the surface 10a that is the target of measurement, in a manner that the surface 10b is covered with the affixing surface 10a. With the black elastomer molded article 10 of the present embodiment, it is difficult for an air bubble or the like to form between the black elastomer molded article 10 and an adherend; even in a case in which a small air bubble is formed, the air bubble can be removed from between the black elastomer molded article 10 and the adherend by, for example, pressing the black elastomer molded article 10 towards the adherend.

Furthermore, the type of the softening agent or the like to be used in the black elastomer molded article 10 is preferably set depending on the material (glass, plastic, etc.) of the adherend.

Second Embodiment

Black Elastomer Molded Article 10A

Figure 3:
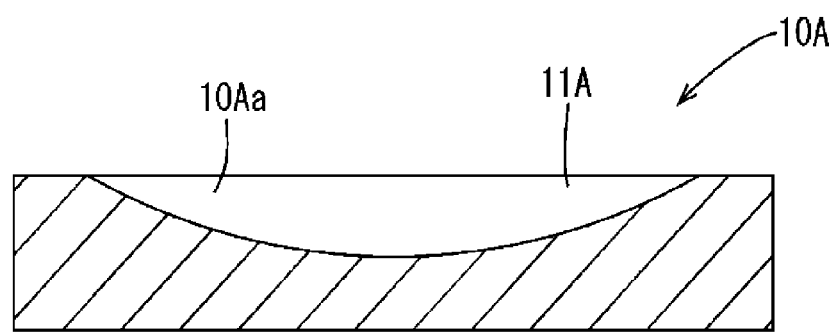
FIG. 3 is a cross-sectional view of a black elastomer molded article according to the second embodiment.

Next, a black elastomer molded article 10A according to the second embodiment will be described with reference to FIG. 3. FIG. 3 is a cross-sectional view of the black elastomer molded article 10A according to the second embodiment. The black elastomer molded article 10A of the present embodiment is a jig used for measuring the optical properties of an optical member (such as a convex optical lens) having a curved surface (hemispherical surface). The black elastomer molded article 10A has a hemispherical recess 11A on the front side thereof, and the surface of the recess is an affixing surface 10Aa to be affixed to an adherend (optical member). As in the present embodiment, the affixing surface 10Aa may be formed in a shape that corresponds to the shape of the surface of the adherend. Note that the properties of the black elastomer molded article 10A of the present embodiment, such as the composition and the FP hardness, are the same as those of the first embodiment.

EXAMPLES

The present technology will be described below in more detail based on examples. The present technology is not limited to these examples.

Production of Molded Article Used on Adherend Made of Glass

Example 1

A mixture containing a predetermined blending amount of each of the components, including a thermoplastic elastomer, a black substance, a process oil, and a filler, was kneaded using a Labo Plastomill (product name "Labo Plastomill 4C150", available from Toyo Seiki Co., Ltd.) at 30 rpm and 180° C. for 3 minutes, resulting in a mixed composition of Example 1. After the obtained mixed composition was allowed to cool to 100° C. or lower, the mixed composition was taken out from the Labo Plastomill and hot-press molded at 180° C. and 50 MPa for 1 minute, resulting in a sheet-shaped molded article of Example 1 (thickness: 3 mm).

The thermoplastic elastomer used was "SEPTON (trade name) 4055" (product name, available from Kuraray Co., Ltd.), a polystyrene-poly(ethylene-ethylene/propylene) block polystyrene (SEEPE) which is a styrene-based thermoplastic elastomer. The refractive index d1 of the styrene-based thermoplastic elastomer is 1.51.

The black substance used was "#900B" (product name, available from Mitsubishi Chemical Corporation), a carbon black (CB) product. The average particle size of the carbon black product is 16 nm. Note that, Table 1 presented the blending ratio (mass %) of carbon black in the mixture (mixed composition).

The process oil used was "PW-32" (produce name, available from Idemitsu Kosan Co., Ltd.). The refractive index d2 of the process oil (PW-32) is 1.47.

The filler used was "N-4" (product name, available from Konoshima Chemical Co., Ltd.), a surface-treated magnesium hydroxide (in which the surface of magnesium hydroxide having an average particle size of approximately 1 μm is treated with oleic acid). Note that, Table 1 presented the blending ratio (mass %) of filler in the mixture (mixed composition).

The selection of each of the components and the blending amount of each of the components in the production of the mixed composition were appropriately set so that the molded article described later had a "reflectance (Ym value)", an "adhesive force (with respect to SUS)", a "FP hardness", and a "surface roughness Ra" of the values presented in Table 1.

Examples 2 to 7 and Comparative Examples 1 to 3

Mixtures containing a predetermined blending amount of each of the components, such as a thermoplastic elastomer, a black substance, a process oil, and a filler, were kneaded in the same manner as in Example 1, resulting in mixed compositions. The obtained mixed compositions were hot-press molded in the same manner as in Example 1, resulting in sheet-shaped molded articles of Examples 2 to 7 and Comparative Examples 1 to 3. The selection of each of the components and the blending amount of each of the components in the production of the mixed compositions of Examples 2 to 7 and Comparative Examples 1 to 3 were appropriately set so that the molded articles described later had a "reflectance (Ym value)", an "adhesive force (with respect to SUS)", a "FP hardness", and a "surface roughness Ra" of the values presented in Table 1.

In Example 4, "PPM0K13784BLK" (product name, available from Toyo Ink Co., Ltd.), which is a carbon nanotube (CNT), was used as the black substance.

In Example 2, "PW-90" (product name, available from Idemitsu Kosan Co., Ltd.) was used as the process oil. The refractive index d2 of the process oil (PW-90) is 1.48.

In Example 5 and the like, "PW-380" (product name, available from Idemitsu Kosan Co., Ltd.) was used as the process oil. The refractive index d2 of the process oil (PW-380) is 1.48.

Measurement of Reflectance (Ym Value)

A test sample having a size of 20 mm×20 mm×3 mm was cut out from each of the molded articles of the Examples and Comparative Examples. The reflectance (%) (Ym value) of the surface of the test sample was measured in accordance with JIS Z 8722:2009 (Methods of color measurement—Reflecting and transmitting objects).

Measurement of Adhesive Force (with Respect to SUS)

A sheet-shaped test sample (20 mm×20 mm×3 mm) of each of the molded articles of the Examples and Comparative Examples, which was used in the measurement of reflectance described above, was prepared. The sheet-shaped test sample was placed on a horizontal table, and an indenter connected to a load cell via a plunger is pressed against the test sample in such a state at a speed of 5 mm/min from where the thickness of the test sample started, which was the starting position, and held for 10 seconds from the point when a load of 4.9 N was applied. After 10 seconds, the indenter was pulled up at a speed of 5 mm/min, and the amount of force required to peel the indenter off from the point when the indenter was raised to the starting position was measured. Note that the indenter has a cylindrical shape with a diameter of 15 mm, and the material thereof is SUS. The results are indicated in Table 1.

Measurement of FP Hardness

A sheet-shaped test sample of each of the molded articles of the Examples and Comparative Examples, which was used in the measurement of the reflectance and the like, was prepared. The Asker FP hardness of the test sample was measured using an Asker Durometer Type FP at 23±3° C. The results are indicated in Table 1.

Measurement of Surface Roughness (Ra)

A sheet-shaped test sample of each of the molded articles of the Examples and Comparative Examples, which was used in the measurement of the reflectance and the like, was prepared. The surface roughness Ra (μm) of the test sample was measured; the surface roughness Ra is an arithmetic average value determined in accordance with JIS B 0601-1994. For the measurement of surface roughness Ra, a surface roughness tester (product name "Surftest SJ-402" available from Mitutoyo Corporation) was used. The results are indicated in Table 1.

Relationship between Refractive Index d1 of Glass and Refractive Index d2 of Process Oil In each of the Examples and Comparative Examples, the process oil was selected to give a difference (d1−d2) between the refractive index d1 of glass as the adherend and the refractive index d2 of the process oil of 0.115 or less.

Relationship between Refractive Index d2 of Process Oil and Refractive Index d3 of Thermoplastic Elastomer In each of the Examples and Comparative Examples, the process oil and the thermoplastic elastomer (styrene-based thermoplastic elastomer) were selected to give a difference (d2−d3) between the refractive index d2 of the process oil and the refractive index d3 of the thermoplastic elastomer (styrene-based thermoplastic elastomer) of 0.115 or less.

Evaluation 1: Measurement of Reflectance (Y Value)

An adherend (50 mm×50 mm×5 mm) made of glass was affixed to the molded article (test sample) of each of Examples and Comparative Examples. Then, the reflectance (%) (Y value) of the surface (the surface to which the molded article was not affixed) of the adherend in such a state was measured in accordance with JIS Z 8722:2009 (Methods of color measurement—Reflecting and transmitting objects). The results are indicated in Table 1.

Evaluation 2: Presence of Air Bubble

For each of Examples and Comparative Examples, visual observation of whether or not an air bubble was formed between the test sample and the adherend was performed at the time of measuring the reflectance (Y value). The results are indicated in Table 1.

TABLE 1-1

| | | Composition of Molded Article | | | | Difference between Refractive Indexes | |
|---|---|---|---|---|---|---|---|
| | Adherend | Elastomer | Black Substance | Oil | Filler | | |
| | (d1) | (d3) | (mass %) | (d2) | (mass %) | d1−d2 | d2−d3 |
| Example 1 | Glass (1.51) | Styrene-based (1.51) | CB (1.0 mass %) | PW-32 (1.47) | 0 | 0.037 | 0.037 |
| Example 2 | Glass (1.51) | Styrene-based (1.51) | CB (1.0 mass %) | PW-90 (1.48) | 3.51 | 0.033 | 0.033 |

TABLE 1-1-continued

| | Composition of Molded Article | | | | | Difference between Refractive Indexes | |
|---|---|---|---|---|---|---|---|
| | Adherend | Elastomer | Black Substance | Oil | Filler | | |
| | (d1) | (d3) | (mass %) | (d2) | (mass %) | d1-d2 | d2-d3 |
| Example 3 | Glass (1.51) | Styrene-based (1.51) | CB (3.4 mass %) | PW-32 (1.47) | 0 | 0.037 | 0.037 |
| Example 4 | Glass (1.51) | Styrene-based (1.51) | CNT (3.4 mass %) | PW-32 (1.47) | 0 | 0.037 | 0.037 |
| Example 5 | Glass (1.51) | Styrene-based (1.51) | CB (1.0 mass %) | PW-380 (1.48) | 3.51 | 0.029 | 0.029 |
| Example 6 | Glass (1.51) | Styrene-based (1.51) | CB (1.0 mass %) | PW-32 (1.47) | 3.51 | 0.037 | 0.037 |
| Example 7 | Glass (1.51) | Styrene-based (1.51) | CB (3.0 mass %) | PW-380 (1.48) | 3.44 | 0.029 | 0.029 |
| Comparative Example 1 | Glass (1.51) | Styrene-based (1.51) | CB (1.0 mass %) | PW-380 (1.48) | 0 | 0.029 | 0.029 |
| Comparative Example 2 | Glass (1.51) | Styrene-based (1.51) | CB (1.1 mass %) | PW-380 (1.48) | 3.82 | 0.029 | 0.029 |
| Comparative Example 3 | Glass (1.51) | Styrene-based (1.51) | CB (1.0 mass %) | PW-380 (1.48) | 3.51 | 0.029 | 0.029 |

TABLE 1-2

| | | | | | Evaluation | |
|---|---|---|---|---|---|---|
| | Reflectance (Ym value) (%) | Adhesion (with respect to SUS) (N/mm) Force | FP Hardness | Surface (Ra) (μm) Roughness | Reflectance with Adherend Affixed (%) (Y value) | Presence of Air Bubble |
| Example 1 | 4.4 | 1.7 | 83 | 0.4 | 5.2 | No |
| Example 2 | 4.5 | 4.2 | 83 | 0.5 | 5.3 | No |
| Example 3 | 4.3 | 2.2 | 83 | 0.7 | 5.4 | No |
| Example 4 | 4.2 | 2.9 | 83 | 0.8 | 5.0 | No |
| Example 5 | 4.5 | 7.7 | 83 | 1.0 | 6.2 | No |
| Example 6 | 4.6 | 3.3 | 83 | 0.6 | 5.7 | No |
| Example 7 | 4.3 | 6.9 | 85 | 0.8 | 5.6 | No |
| Comparative Example 1 | 4.2 | 5.2 | 83 | 1.8 | 8.4 | Yes |
| Comparative Example 2 | 4.5 | 7.4 | 87 | 0.8 | 7.5 | Yes |
| Comparative Example 3 | 5.1 | 7.0 | 82 | 1.0 | 8.5 | No |

Examples 1 to 7 are molded articles (black elastomer molded articles) used by affixing to an adherend made of glass. In the molded articles of Examples 1 to 7, no air layer (air bubble) was found between the molded article and the adherend when affixing the molded article to the adherend. Furthermore, the molded articles of Examples 1 to 7 had a reflectance (%) (Y value) of 6.2% or less in a state in which the adherend was affixed, confirming that the optical effects (such as reflection) on the surface of the adherend that was adhered to the molded article were suppressed. Note that, in Examples 1 to 4, the reflectance (%) (Y value) was 5.4% or less, yielding particularly preferred results.

The molded article of Comparative Example 1 is a case in which the value of the surface roughness Ra of the molded article is too large. Regarding the case in which the value of the surface roughness Ra of the molded article is large, generally, when the surface (affixing surface) of a molded article is rough, the reflectance can be suppressed to a low level. However, in Comparative Example 1, since the surface (affixing surface) of the molded article was rough, it became easy for an air bubble to enter between the adherend and the molded article. Note that, in Comparative Example 1, although an attempt was made to remove the air bubble by pressing the molded article towards the adherend, the air bubble tends to remain on the surface of the molded article due to the rough surface, and the air bubble could not be removed. In Comparative Example 1, due to the impact of the air bubble or the like, the reflectance (%) (Y value) was 8.4%, which was a high value.

The molded article of Comparative Example 2 is a case in which the FP hardness of the molded article is too high. In Comparative Example 2, an air bubble also entered between the adherend and the molded article. As in Comparative Example 1, an attempt was also made in Comparative Example 2 to remove the air bubble, but the air bubble between the molded article and the adherend could not be pushed to the outside due to insufficient softness of the molded article.

The molded article of Comparative Example 3 is a case in which the reflectance (Ym value) is 5.1%, that is, a case in which the "blackness" is insufficient. As such, although no air bubble was formed between the molded article and the adherend, the reflectance (%) (Y value) in a state in which the adherend was affixed was 6.8%, which was a high value, due to insufficient "blackness".

Production of Molded Article Used on Adherend Made of PC

Example 8

A mixture containing a predetermined blending amount of each of the components, such as a thermoplastic elastomer, a black substance, a process oil, and a filler, was kneaded in the same manner as in Example 1, resulting in a mixed composition. The obtained mixed composition was hot-press molded in the same manner as in Example 1, resulting in a sheet-shaped molded article of Example 8.

The selection of each of the components and the blending amount of each of the components in the production of the mixed composition of Example 8 are appropriately set so that the molded article described later has a "reflectance (Ym value)", an "adhesive force (with respect to SUS)", a "FP hardness", and a "surface roughness Ra (μm)" of the values presented in Table 2.

Relationship between Refractive Index d1 of PC and Refractive Index d2 of Process Oil In Example 8, the process oil was selected to give a difference (d1−d2) between the refractive index d1 of PC (polycarbonate) as the adherend and the refractive index d2 of the process oil of 0.115 or less.

Relationship between Refractive Index d2 of Process Oil and Refractive Index d3 of Thermoplastic Elastomer In Example 8, the process oil and the thermoplastic elastomer (styrene-based thermoplastic elastomer) were selected to give a difference (d2−d3) between the refractive index d2 of the process oil and the refractive index d3 of the thermoplastic elastomer (styrene-based thermoplastic elastomer) of 0.115 or less.

Evaluation 1: Measurement of Reflectance (Y Value)

An adherend made of polycarbonate (PC) (50 mm×50 mm×3 mm) was affixed to the molded article (test sample) of Example 8. Then, the reflectance (%) (Y value) of the surface (the surface to which the molded article was not affixed) of the adherend in such a state was measured in accordance with JIS Z 8722:2009 (Methods of color measurement—Reflecting and transmitting objects). The results are indicated in Table 2.

Evaluation 2: Presence of Air Bubble

For Example 8, visual observation of whether or not an air bubble was formed between the test sample and the adherend was performed at the time of measuring the reflectance (Y value). The results are indicated in Table 2.

Reference Example

The molded article of Example 1, used by being affixed to an adherend made of glass, was affixed to an adherend made of polycarbonate, and the same evaluation as in Example 8 was performed. The results are indicated in Table 2.

TABLE 2-1

| | Composition of Molded Article | | | | | Difference between Refractive Indexes | |
|---|---|---|---|---|---|---|---|
| | Adherend | Elastomer | Black Substance | Oil | Filler | | |
| | (d1) | (d3) | (mass %) | (d2) | (mass %) | d1-d2 | d2-d3 |
| Example 8 | PC (1.59) | Styrene-based (1.51) | CB (1.0 mass %) | PW-90 (1.48) | 0 | 0.113 | 0.033 |
| Example 1 (Reference Example) | PC (1.59) | Styrene-based (1.51) | CB (1.0 mass %) | PW-32 (1.47) | 0 | 0.117 | 0.037 |

TABLE 2-2

| | Adhesion | | | | Evaluation | |
|---|---|---|---|---|---|---|
| | Reflectance (Ym value) (%) | (with respect to SUS) (N/mm) Force | FP Hardness | Surface (Ra) (μm) Roughness | Reflectance with Adherend Affixed (%) (Y value) | Presence of Air Bubble |
| Example 8 | 4.4 | 2.7 | 83 | 1.0 | 5.8 | No |
| Example 1 (Reference Example) | 4.4 | 1.7 | 83 | 0.4 | 6.8 | No |

Example 8 is a molded article (black elastomer molded article) used by affixing to an adherend made of polycarbonate. In the molded article of Example 8, no air layer (air bubble) was found between the molded article and the adherend when affixing the molded article to the adherend. Furthermore, the molded article of Example 8 had a reflectance (%) (Y value) of 5.8% in a state in which the adherend was affixed, confirming that the optical effects (such as reflection) on the surface of the adherend that was adhered to the molded article were suppressed.

Note that, regarding the molded article of Example 1 evaluated as a Reference Example, no bubble was observed between the adherend and the molded article even in a case of an adherend made of PC, the same as in the case of an adherend made of glass. However, in the case of Example 1, when the adherend is made of PC, the difference ($d_1-d_2$) between the refractive index $d_1$ of the adherend and the refractive index $d_2$ of the softening agent (process oil) was 0.117, which was a big difference. As such, the reflectance (%) (Y value) of the molded article in a state in which the adherend was affixed was 6.8%. Therefore, in the case of an adherend made of polycarbonate, it can be said that Example 8 is preferable to Example 1. Note that, it can be said that the molded article of Example 1 is preferably used on an adherend made of glass. In this manner, the black elastomer molded article is preferably designed while taking into consideration the relationship between the refractive index $d_1$ of the adherend and the refractive index $d_2$ of the softening agent (process oil).

The technology is not limited to the above embodiments, and various modifications and changes can be made within the scope of the gist of the technology.

The invention claimed is:

1. A black elastomer molded article provided with an affixing surface to which an adherend having light transmission property is affixed in a removable manner, wherein
the black elastomer molded article includes a thermoplastic elastomer, a black substance, and a softening agent,
the softening agent is included so that a thin film composed of the softening agent is absorbed on a surface of the adherend, and
the black elastomer molded article has an Asker FP hardness of 85 or less at 23±3° C.,
a reflectance (Ym value) of the affixing surface being 5.0% or less, the reflectance being measured in accordance with JIS Z 8722-2009,
a surface roughness (Ra) of the affixing surface being 1.0 μm or less, and
an adhesive force (with respect to SUS) of the affixing surface being from 1.0 N/mm to 8.0 N/mm, the adhesive force being measured by pressing an indenter made of SUS against a test sample at a speed of 5 mm/min from a starting position where thickness of the test sample, holding for 10 seconds from a point when a load of 4.9N is applied, pulling the indenter up at a speed of 5 mm/min to the starting position and measuring an amount of force required to peel the indenter off from a point when the indenter is raised to the starting position.

2. The black elastomer molded article according to claim 1, wherein a difference ($d_1-d_2$) between a refractive index $d_1$ of the adherend and a refractive index $d_2$ of the softening agent is 0.115 or less.

3. The black elastomer molded article according to claim 1, wherein a difference ($d_2-d_3$) between a refractive index $d_2$ of the softening agent and a refractive index $d_3$ of the thermoplastic elastomer is 0.115 or less.

4. The black elastomer molded article according to claim 1, wherein the black elastomer molded article includes a filler in addition to the black substance.

5. The black elastomer molded article according to claim 1, wherein the thermoplastic elastomer is composed of a styrene-based thermoplastic elastomer.

* * * * *